United States Patent
Schmidt

(10) Patent No.: US 11,196,795 B2
(45) Date of Patent: Dec. 7, 2021

(54) METHOD AND APPARATUS FOR PREDICTING VIDEO DECODING TIME

(71) Applicant: ARRIS Enterprises LLC, Suwanee, GA (US)

(72) Inventor: Mark S. Schmidt, San Diego, CA (US)

(73) Assignee: ARRIS Enterprises LLC, Sawanee, GA (US)

(*) Notice: Subject to any disclaimer, the term of this patent is extended or adjusted under 35 U.S.C. 154(b) by 0 days.

(21) Appl. No.: 17/211,566

(22) Filed: Mar. 24, 2021

(65) Prior Publication Data
US 2021/0306403 A1 Sep. 30, 2021

Related U.S. Application Data

(60) Provisional application No. 62/994,455, filed on Mar. 25, 2020.

(51) Int. Cl.
*H04L 29/06* (2006.01)
*H04N 21/2662* (2011.01)

(52) U.S. Cl.
CPC ............ *H04L 65/80* (2013.01); *H04L 65/601* (2013.01); *H04L 65/607* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 10,257,107 B1* | 4/2019 | Hegar | H04L 69/161 |
| 2013/0103849 A1* | 4/2013 | Mao | H04N 21/6332 |
| | | | 709/231 |
| 2013/0298170 A1* | 11/2013 | ElArabawy | H04L 47/30 |
| | | | 725/62 |
| 2016/0057489 A1* | 2/2016 | He | H04N 21/8456 |
| | | | 725/14 |
| 2016/0234549 A1* | 8/2016 | Ducloux | H04N 21/4424 |
| 2017/0208335 A1* | 7/2017 | Ramamurthy | H04N 19/172 |
| 2019/0014363 A1* | 1/2019 | Skupin | H04N 21/4402 |
| 2020/0213640 A1* | 7/2020 | Watson | H04N 21/643 |

OTHER PUBLICATIONS

Andy C. Bavier, A. Brady Montz, and Larry L., "Predicting MPEG execution times." In Proceedings of the 1998 ACM SIGMETRICS joint international conference on Measurement and modeling of computer systems (SIGMETRICS '98/Performance '98). Association for Computing Machinery, New York, NY, USA, p. 131-140 (Year: 1998).*

* cited by examiner

Primary Examiner — Jonathan A Bui
(74) Attorney, Agent, or Firm — Chernoff Vilhauer LLP

(57) ABSTRACT

A method and apparatus for predicting the software frame decoding time for an HLS variant bit stream based on measurements of the frame decoding time for the lowest bit rate variant given in the master playlist and acquired and played at initial session startup. This permits the determination of a maximum bitrate setting to be refined and applied at startup such that a media program player does not attempt to download and decode variants that might exceed its CPU capacity, thus preventing playback stalls and similar failures.

20 Claims, 10 Drawing Sheets

METHOD AND APPARATUS FOR PREDICTING VIDEO DECODING TIME

CROSS-REFERENCE TO RELATED APPLICATIONS

This application claims benefit of U.S. Provisional Patent Application No. 62/994,455, entitled "METHOD AND APPARATUS FOR PREDICTING VIDEO DECODING TIME," by Mark S. Schmidt, filed Mar. 25, 2020, which application is hereby incorporated by reference herein.

BACKGROUND

1. Field

The present disclosure relates to systems and methods for receiving and presenting media programs, and in particular to a method and apparatus for adaptively requesting, receiving processing and presenting such media programs.

2. Description of the Related Art

Quality of media playback across a network is dependent upon the client being able to retrieve chunks of media, decode the individual media streams, and render them in real time. There are many factors that can affect the client's ability to ultimately render the media satisfactorily. Typically, network throughput is determined and used to select the appropriate stream. Network throughput is not the only limiting factor involved in media playback.

HTTP Live Streaming (HLS) enables media playback over a network by breaking down a program into digestible segments of media data and providing a means by which the client can query the available segments, download, and render the individual segments. Additionally, HLS provides a mechanism for publishing chunks of varying bitrate and resolution, advertised as the number of bits per second and horizontal/vertical picture dimensions, required to render the media, respectively. Client applications have typically determined the available throughput of the network and selected the highest bitrate available that can be downloaded for the given throughput. However, network throughput or bandwidth is only one of the factors impacting media playback quality. Some media playback sessions are performed by software audio and video decoders providing rendering to, e.g., web browser applications; if these software decoding methods cannot perform real-time decoding of high bitrate variants due to inadequate CPU and/or memory resources, methods are required to limit the maximum bitrate variant retrieved by the client regardless of whether the network supports delivery of higher bitrate/resolution variants.

What is needed is a system and method for that improves media playback quality by measuring or predicting other factors that affect playback quality and requesting segments of suitable size to assure that playback quality is maximized. The methods and systems described herein satisfy that need.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for receiving and decoding a media program. The media program selected from a plurality of media program variants, each of the plurality of media program variants of an associated resolution and generated for transmission at an associated bit rate different than a bit rate associated with the other media program variants, each of the plurality of media program variants comprising an associated plurality of media program version segments. In one embodiment, the method comprises (a) transmitting a request for the media program and (b) receiving a master playlist for the requested media program. The master playlist comprises the bit rate and a resolution associated with each media program variant and an index to plurality of media playlists, each media playlist having an address to each of a plurality of media program segments of an associated variant of the media program. The method also comprises (c) transmitting a request for a media program segment of a first variant of the media program, the first variant of the media program generated for transmission at a first bit rate and having a first resolution, (d) receiving the requested media program segment, (e) determining a time duration required to decode a picture of the received media program segment, (f) estimating a time duration required to decode a picture of a media program variant segment of another media program variant. This estimate is determined at least in part from the time duration required to decode the picture (hereafter alternatively referred to as the decoding time) of the received media program segment, the first bit rate, the first resolution, a bit rate associated with the another media program variant, and a resolution associated with the another media program variant. The method further comprises (g) comparing the estimated time duration taken to decode the picture of the media program variant segment of the another media program variant with a duration of the picture of the media program variant segment of the another media program variant, (h) selecting one of another media program segment of the first variant and another media program segment of the another media program variant according to the comparison, and (i) transmitting a request for the selected one of the another media program segment of the first variant and the another media program segment of the another media program variant according to the comparison.

Another embodiment is evidenced by a processor communicatively coupled to a memory that stores processor instructions for performing the above recited operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
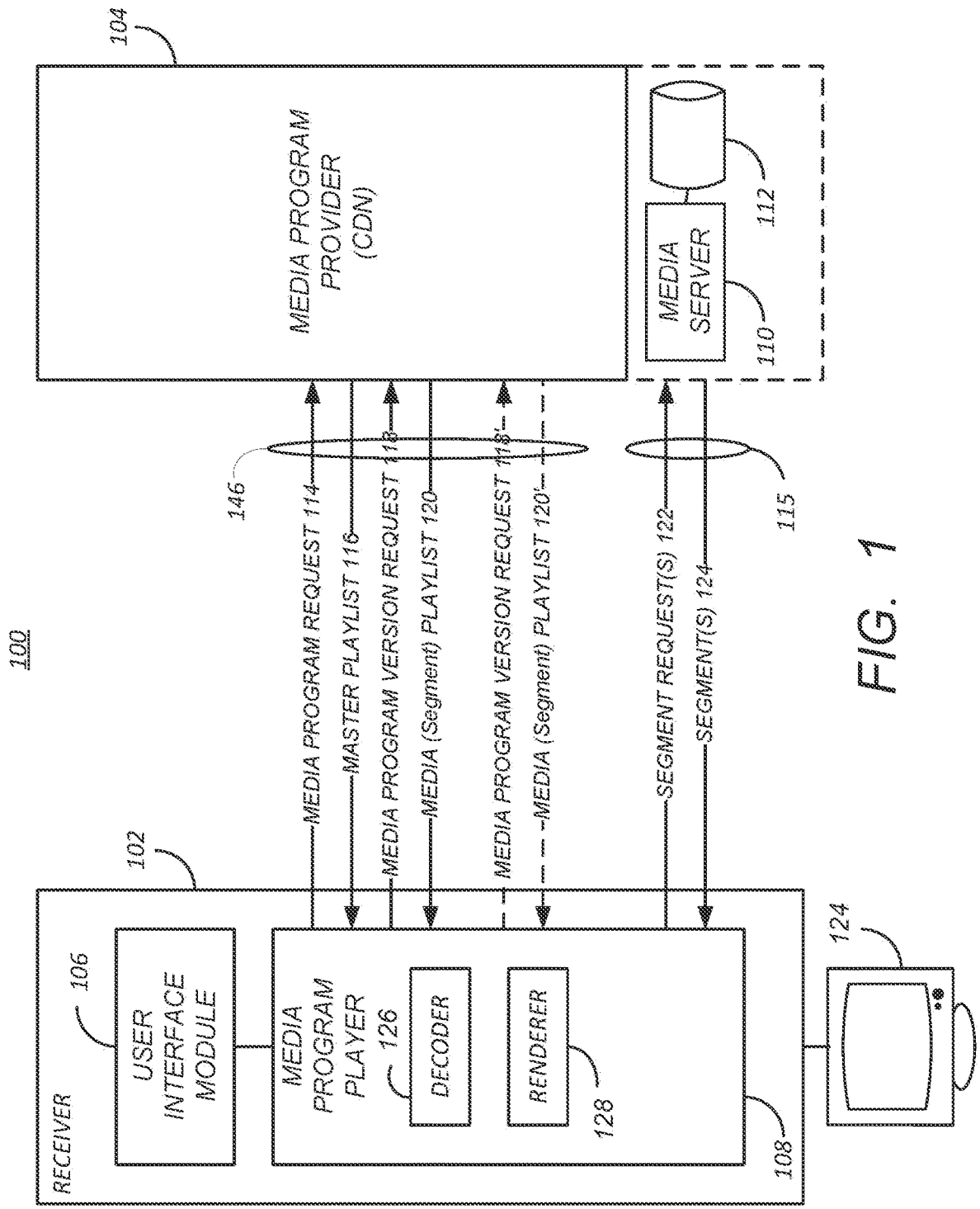
FIG. 1 is a diagram depicting one embodiment of a content distribution system.

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

Browser based video players such as the SECUREMEDIA browser ATPLAYER2 player typically require large pre-AVC and post-AVC decoder buffers to assure stability. Such players typically measure the average central processing unit (CPU) time required to decode an AVC frame for the first low-bitrate variant it downloads and make a decision as to whether there is sufficient CPU power to switch to a higher bitrate variant. Unfortunately, due to the required large buffers and absence of foreknowledge of the time to decode an AVC variant, the player can load up to 60 secs of a new high bitrate variant and not be able to decode in real-time. This results in long (~60 second) stalls in video playback and an oscillatory behavior in the algorithm that selects the appropriate HLS variant for the next segment or chunk.

Disclosed below is a system and method that maintains and constantly monitors other contributing factors, as well as monitors ongoing playback performance to determine the optimal bitrate for playback on the system.

This disclosure describes a system and method for predicting the software frame decoding time for an HLS variant bit stream based on measurements of the frame decoding time for the lowest bit rate variant given in the master playlist and acquired and played at initial session startup. The goal is to predict a maximum bitrate setting to be refined and applied at startup such that the software player does not attempt to download and decode variants that might exceed its CPU capacity, thus preventing playback stalls and similar failures. This allows the player to skip over variants that are predicted to be decodable in real-time given that adequate network bandwidth is available for download.

This heuristic algorithm attempts to predict the software decoder's time to decode frames at higher bitrates and resolutions using measures of the frame decoding time for a lowest bitrate and resolution and scaling up based on bitrate and picture resolution. This provides a more accurate and timely prediction of which variant to select based on the initial measurements of the CPU frame decode times of the host PC for the lowest bitrate variant of the asset.

The ATPLAYER2 software player utilizes a software AVC decoder library composed of a collection of software modules. The decoder is capable of real time AVC decoding on most modern personal computers (PCs) for non-high definition (HD) content (i.e., bitrates of <6 to 8 Mbps and resolutions/frame rates <1080i60 or 720p60). However, at non-HD bitrates approaching 4 Mbps and a resolution/frame rate of 720p30, the AVC decoding takes close to 100% of the CPU on both MACINTOSH and PC computer. It is desired for the software player to determine a threshold "max bitrate" to which a particular session to decode content should be limited to assure adequate performance without freezing or other anomalies.

For many decoding algorithms including AVC, bit-serial operations such as the context-adaptive binary arithmetic coding (CABAC) bit stream decompression algorithm, use more CPU cycles as the stream bit rate increases. Conversely, decoding algorithms such as spatial transformation and temporal motion estimation/compensation have increasing complexity with increasing number of macroblocks per picture, i.e., as the encoded stream resolution/size increases. Hence, it is possible to use these two observations to scale a time measurement for a currently decoded stream variant to measurement predictions for variants that haven't been downloaded/decoded, as described further below.

Content Distribution System

FIG. 1 is a diagram depicting one embodiment of a content distribution system 100 (CDS). The depicted CDS 100 comprises a receiver 102 communicating with a media program provide or content distribution network (CDN) 104. The receiver 102 comprises a media program player (MPP) 108 communicatively coupled to a user interface module 106. The user interface module 106 accepts user commands and provides such commands to the MPP 108. The user interface module 106 also receives information from the MPP 108 including information for presenting options and controls to the user and media programs to be displayed. A media server 110 communicatively coupled to storage device 112 provides media programs to the receiver 102 as further described below. As illustrated, the media server 110 and storage 112 may be part of the CDN 104 or a separate entity such as AKAMAI. The receiver 102 may be embodied in a device known as a set-top-box (STB), integrated receiver/decoder, tablet computer, desktop/laptop computer, or smartphone.

In one embodiment, the media program is provided to the receiver 102 using hypertext transfer protocol (HTTP) live streaming (HLS). HLS is a technology for streaming on-demand audio and video to receivers 102 such as cellphones, tablet computers, televisions, and set top boxes. HLS streams behave like regular web traffic, and adapts to variable network conditions, dynamically adjusting playback to match the available speed of wired and wireless communications.

Figure 2:
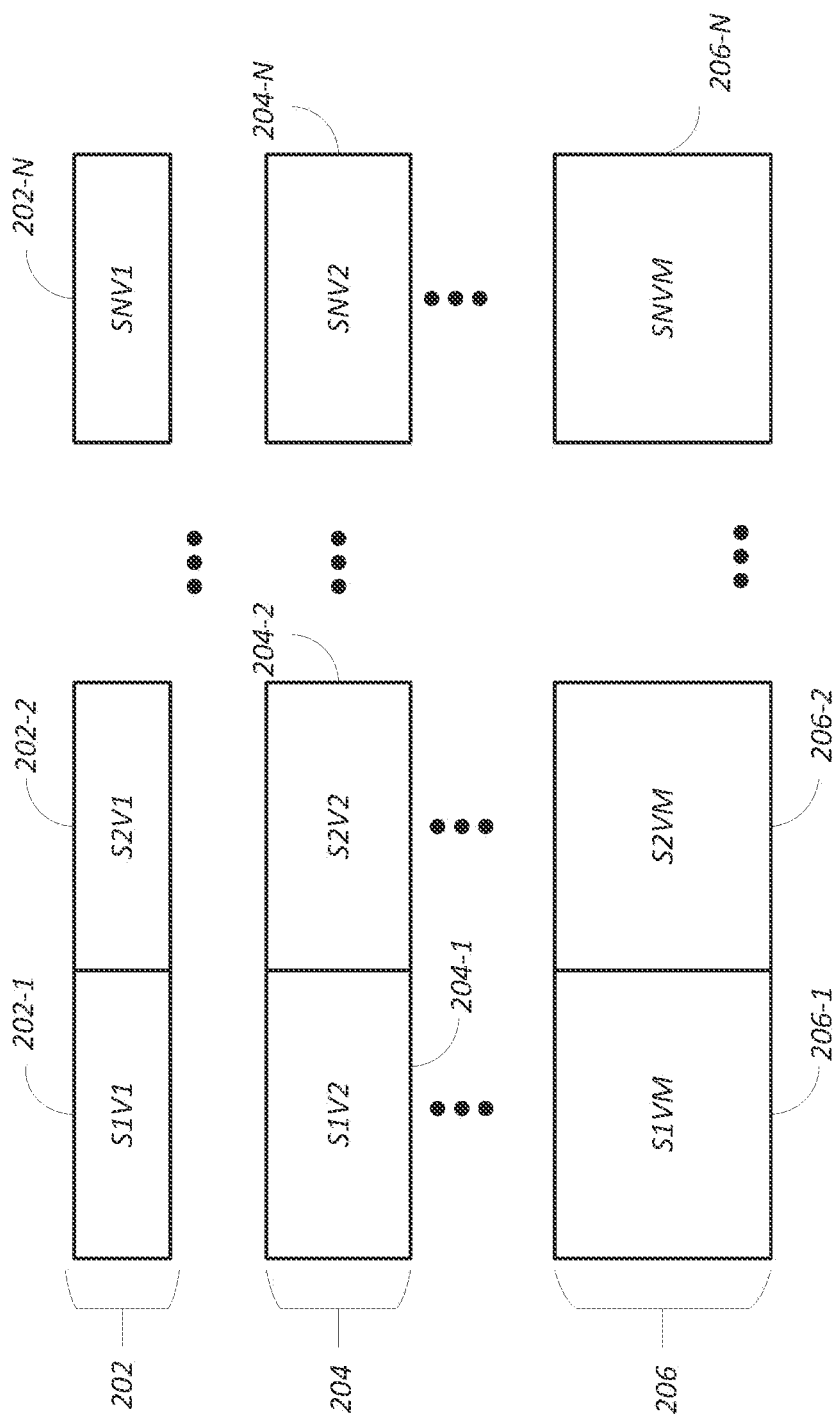
FIG. 2 is a diagram illustrating a representation of an HLS-encoded video program.

FIG. 2 is a diagram illustrating a representation of an HLS-encoded video program. In a typical HLS workflow, a video encoder that supports HLS receives a live video feed or distribution-ready media file. The encoder creates multiple versions (known as variants) of the audio/video at different bit rates, resolutions, and quality levels. In the embodiment illustrated in FIG. 2, M versions of the media program are created, with "V1" indicating a first (and "lightest") version of the media program 202, "V2" indicating the second version of the media program 204 and "VM" indicating the $M^{th}$ (and "heaviest") version of the media program 206.

The encoder then segments the variants 202-206 into a series of small files, called media segments or chunks. In the illustrated embodiment, the first version of the media program 202 is segmented into N segments S1, S2, . . . , SN of equivalent temporal length. The N segments of version one of the media program are denoted as S1V1 202-1, S2V1 202-2, . . . , SNV1 202-N, respectively, the N segments of version two of the media program are denoted as S1V2

204-1, S2V2 204-2, . . . , SNV2 204-N, respectively, and the N segments of version M of the media program are denoted as S1VM 206-1, S2VM 206-2, . . . , SNVM 206-N, respectively. In FIG. 2, the depicted size each chunk of each version of the media program is indicative of the size of the chunk in bytes. In other words, chunk S1VM 202-1 is a higher-resolution variant of segment 204 than is chunk S1V1 206-1.

At the same time, the encoder creates a media playlist file for each variant 202-206 containing a list of URLs pointing to the variant's media segments. The encoder also creates a master playlist file, containing a list of the URLs to variant media playlists, and descriptive tags to control the playback behavior of the stream. While producing playlists and segments, the encoder or automated scripts upload the files to a web server or CDN. Access is provided to the content by embedding a link to the master playlist file in a web page, or by creating a custom application that downloads the master playlist file.

In one embodiment, the encoder creates media segments by dividing the event data into short MPEG-2 transport stream files (.ts). Typically, the files contain H.264 video or AAC audio with a duration of 5 to 10 seconds each. The encoder typically allows the user to set the encoding and duration of the media segments, and creates the media playlists as text files saved in the M3U format (.m3u8). The media playlists contain uniform resource locators (URLs) to the media segments and other information needed for playback. The playlist type—live, event, or video on demand (VOD)—determines how the stream can be navigated.

The master playlist provides an address for each individual media playlist in the media program stream. The master playlist also provides important details such as bandwidth, resolution, and codec. The MPP 108 uses that information to decide the most appropriate variant for the device and the currently measured, available bandwidth.

Hence, the master playlist (e.g. masterplaylist.m3u8) include variants of the media program, with each variant is described by a media playlist suitable for different communication channel throughputs. The media playlist includes a list of media segments or "chunks" to be streamed and reproduced, and the address where each chunk may be obtained.

In a specific example, the media playlists includes a media playlist cellular_video.m3u8, having a lower resolution version of the media program suitable for low bandwidth cellular communications channels, a wifi_video.m3u8 having a higher bandwidth version of the media program suitable for higher bandwidth communications channels, and appleTV_video.m3u8 having a high resolution version of the media program suitable for very high bandwidth communications channels). The order of the media playlists in the master playlist does not matter, except that when playback begins, the MPP 108 begins streaming first variant it is capable of playing, which is typically the lowest resolution variant 202. If conditions change and the MPP 108 can no longer play that version of the media program, the player switches midstream to another media playlist midstream of lower resolution. If conditions change and the MPP 108 is capable of playing a higher resolution version of the media program, the player switches midstream to the media playlist associated with that higher resolution version.

Referring back to FIG. 1, the MPP 104 transmits a media program request 114 to the CDN 104, and in response, receives a master playlist 116. Using the master playlist, the MPP 108 selects a version of the media program (typically the version that is first on the master playlist, but may be the easiest version to decode, which is typically the smallest chunk or segment 206-1) and requests the media (segment) playlist 120 associated with that version of the media program. The MPP 108 recites the media playlist 120, and using the media playlist 120, transmits segment requests 122 for the desired media program segments. The media server 110 retrieves the media program segments 124 and provides them to the MPP 108, where they are received, decoded, and rendered.

Figure 3:
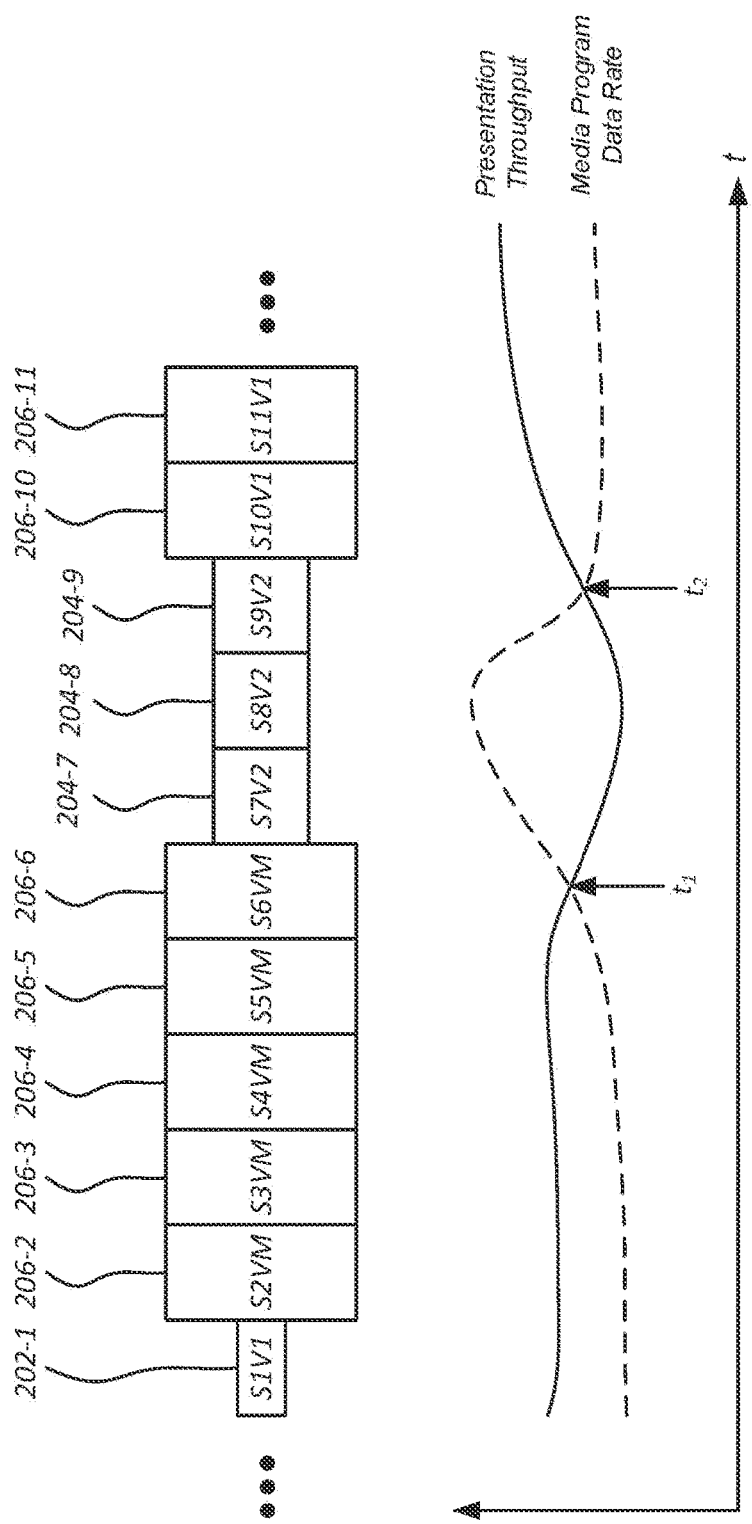
FIG. 3 is a diagram illustrating one example of the streaming of segments of a media program using the HLS protocol.

FIG. 3 is a diagram illustrating one example of the streaming of segments of a media program using the HLS protocol. Modern video compression schemes such as MPEG result in frames or series of frames having a more data than other frames or series of frames. For example, a scene of a media program may depict a person or object against a smooth (spatially substantially unchanging) and/or constant (temporally substantially unchanging) background. This may happen, for example if the scene is comprised of a person speaking. Such scenes typically require less data than other scenes, as the MPEG compression schemes can substantially compress the background using spatial and temporal compression techniques. Other scenes may depict a spatially and temporally complex scene (for example, a crowd in a football stadium) that cannot be as substantially compressed. Consequently, the size of the data that needs to be communicated to the MPP 108 and decoded and rendered by the MPP 108 varies substantially over time, as shown in FIG. 3. At the same time, the presentation throughput (the throughput of the communication channel combined with the computational throughput of the MPP 108 in decoding and rendering the media program) also changes over time. Since more complex frames may require more processing to decode and render, the processing throughput of the MPP 108 can be inversely related to the media program data rate, with processing throughput (and hence, the presentation throughput) becoming lower when the media program data rate is highest.

To account for this, the MPP 108 refers to the master playlist to find a media playlist of segments more suitable for the presentation throughput, retrieves this media playlist, and using the media playlist, requests segments of the appropriate type and size or the presentation throughput and the media program data rate. In the example presented in FIG. 3, the MPP 108 has requested media program segments 202-1 through 202-6 from a first media playlist. Media program segment 202-1 S1V1 is selected, as it is the smallest and easiest to process segment. The decoder 126 thereafter determines that it can process and decode segments of higher bit rate and resolution, so thereafter requests and receives higher resolution and higher bit rate media program segments 206-2 through 206-6 which are decoded, and rendered with no degradation of quality, as the media program data rate remains less than the presentation throughput. However, at time $t_1$, the media program data rate (or resolution) rises and the presentation throughput falls to the point where the quality of playback is no longer as desired. At this point, the MPP 108 detects the inadequate presentation throughput and consults the master playlist to find a media playlist for a "lighter" (e.g. smaller in size and/or easier to perform the presentation processing) version of the media program. The MPP 108 uses the master playlist 116 to transmit a media program version request 118' for a media segment playlist 120' of media program segments of that can be received and presented with adequate quality. In the illustrated embodiment, this is version 2 of the media program. The MPP 108 receives this media playlist 120' and uses the playlist to select the required media program segments. Since segments 1-6 have already been provided, the MPP 108 transmits a segment request 122 for media program segments of version two of the media program beginning with segment seven, S7V2 204-7. The MPP 108 continues to request version two of the media program, so long as the media program data rate exceeds the available presentation throughput. Similarly, at time $t_2$, the MPP 108 detects that the available presentation throughput exceeds the media program data rate, and using analogous procedures to those described above, requests segments 10 and 11 of the first version of the media program.

Figure 4A:
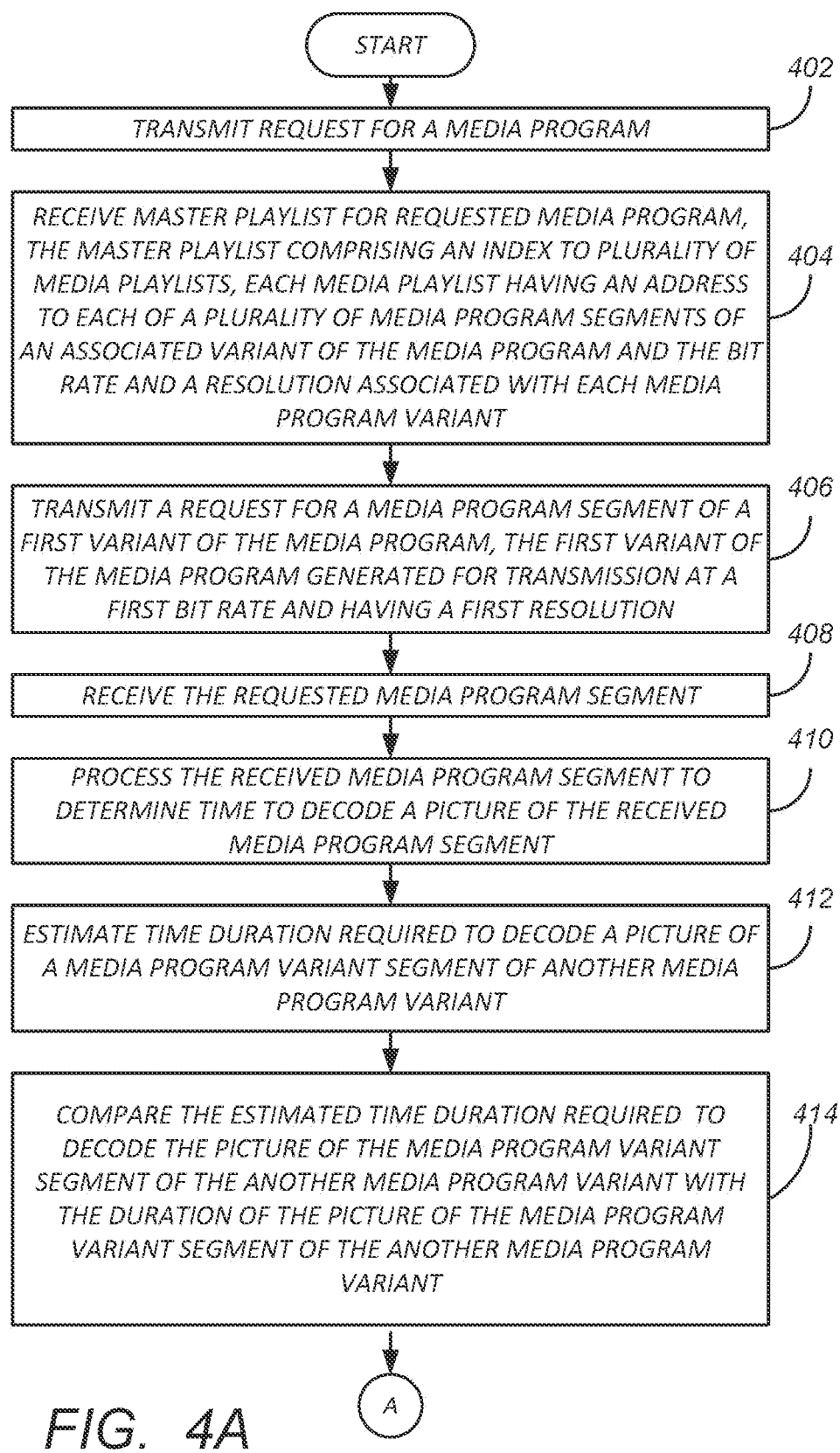
FIGS. 4A-4B are diagrams depicting an exemplary process to receive and process media programs.
Figure 4B:
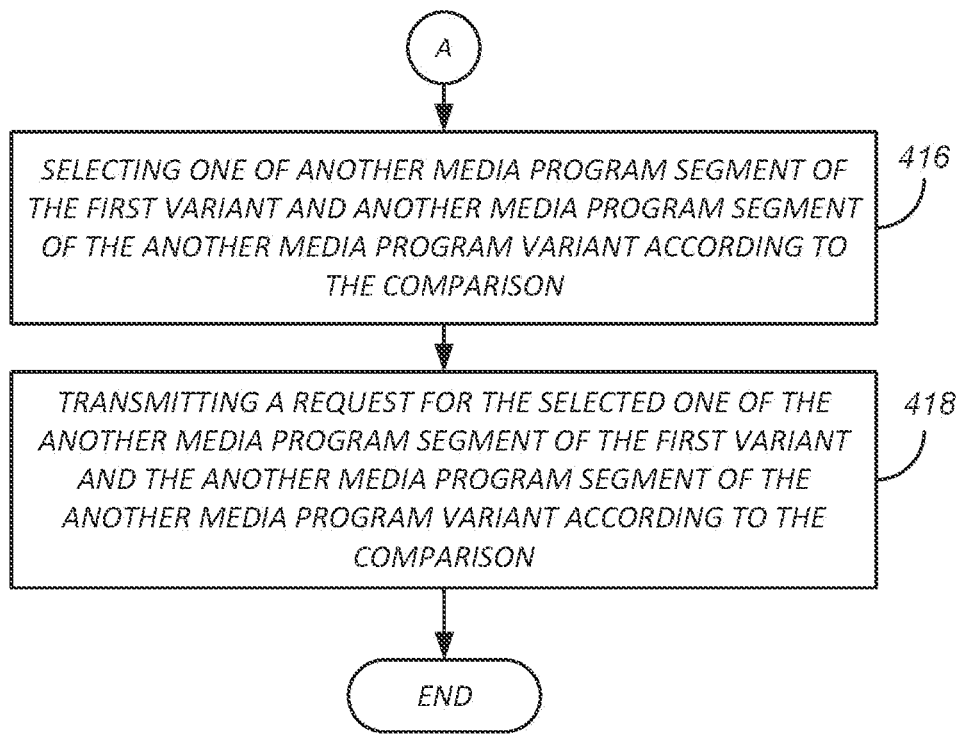

FIGS. 4A-4B are diagrams depicting an exemplary process to receive and process media programs. In block 402, a request is transmitted for a media program to the CDN or MPP 104. In block 404, a master playlist is received by the MPP 108.

The master playlist 116 comprises an index to a plurality of media playlists. Each such media playlist 120 comprises an address to each of a plurality of media program segments of a related variant of the media program suitable for transmission at an associated bit rate. The master playlist 116 also comprises a bit rate and a resolution associated with each media program variant.

In block 406, a request 122 is transmitted for a media program segment 124 of the plurality of media programs of a first variant of the media program. The request 122 is transmitted to the media server 110 and includes an address (e.g. URL) from which the media program segment is obtained. The request is transmitted for a first variant of the media program that was generated for and associated with a first bit rate and having a first resolution. In one embodiment, this requested first variant is the smallest variant, for example, the variant of the media program that is easiest to transmit and/or process, for example variant 202 illustrated in FIG. 2, which comprises segments S1VM 202-1 through SNVM 202-N.

In block 408, the requested media segment is received via communication path 115.

Note that the segment requests 122 and/or segments 124 may be transceived via a different communication channel 115 with different throughput or bandwidth than the communication channel 146 used to transmit and receive program requests 114, master playlists 116, media program version requests 118, and media playlists 120.

In block 410, the received media program segment is processed to determine the time duration required to decode a picture of the received media program segment. Since the time it takes to decode a picture can vary depending on the complexity of the picture and whether the picture represents and I, P or B frame, the time duration required to decode a picture of the received media program segment can be determined over a plurality of pictures of the received media program segment, thereby generating an average time duration required to decode a picture during the interval of the selected plurality of pictures. This interval may be selected to include more than one group of pictures (GOP) or a single GOP. In one embodiment, the average picture decoding time is determined by decoding every picture in the received media program segment and dividing the total time duration required to decode every picture in the segment by the number of pictures. In one embodiment, boxcar averaging (where the determined tie to decode picture N is determined by averaging the time duration required to decode pictures N, N+1, . . . , N+K) is used. Other filtering methods may be used, or the average time duration required to decode value can be determined using knowledge of the picture types expected in the segment.

In block 412, the time duration required to decode a picture of a media program segment variant of another media program variant is estimated. As described above, it is noted that the processing power (and hence, the time) to decompress the bit stream varies based on at least two factors: the processing required to decompress the incoming CABAC bit stream, and the time required to perform the spatial and temporal decompression. The first factor is dependent upon the bit rate of the media program segment in which the picture is conveyed, and the second factor is dependent upon the picture complexity (e.g. number of macroblocks), which is related to the resolution of the picture. Hence, the time duration required to decode a picture of a known or estimable bit rate and resolution can be determined to be a scaled up version of the known or measured time duration required to decode the picture also with a known (but different) bit rate or resolution. For example, the time required to decode a particular version $V_i$ of a media program segment $T_{dec}(V_i)$ can be determined according to Equation (1):

$$T_{dec}(V_i) = T_{dec}(V_1)\left[\alpha \frac{BR(V_1)}{BR(V_i)} + (1-\alpha)\frac{MB(V_1)}{MB(V_i)}\right]^{-1} \quad \text{Equation (1)}$$

for $i = 1, \ldots, M$ where: $T_{dec}(V_i)$ is the estimated time duration required to decode a picture of a media program variant segment of the $i^{th}$ media program variant; $T_{dec}(V_1)$ is the decoding time of the picture of the received media program segment; $BR(V_1)$ is the first bit rate; $BR(V_i)$ is the bit rate associated with the $i^{th}$ media program variant; $MB(V_1)$ is the first resolution; and $MB(V_i)$ is the resolution associated with the $i^{th}$ media program variant. In this embodiment, the time duration required to decode a picture of a media program variant segment of another media program variant is estimated at least in part from the decoding time of the picture of the received media program segment $T_{dec}(V_1)$; a ratio of the first bit rate and the bit rate associated with the another media program variant $$\frac{BR(V_1)}{BR(V_i)};$$

and a ratio of the first resolution and the resolution associated with the another media program variant $$\frac{MB(V_1)}{MB(V_i)}.$$

In the embodiment of Equation 1, the ratios $$\frac{BR(V_1)}{BR(V_i)} \text{ and } \frac{MB(V_1)}{MB(V_i)}$$

are weighted by a scale factor $\alpha$.

Hence, $T_{dec}(V_i)$ for i=1, . . . , M represents the predicted average software AVC picture decoding time for the $i^{th}$ variant $V_i$ of M variants described in the master playlist and $V_1$ represents the lowest bitrate/resolution variant that is acquired and decoded at session startup. BR(V) represents the bitrate of the variant and MB(V) is the number of macroblocks for the variant V. The number of macroblocks for the variant V can be determined from Equation (2):

$$MB(V) = (H_{res} * V_{res})/256 \qquad \text{Equation (2)}$$

where $H_{res}$, $V_{res}$ are the horizontal and vertical pixel resolutions, respectively, for the variant.

The scale factor, a, is a weighting factor such that for α=1, the algorithm only uses ratios of bitrates (BR) while α=0 uses ratios of picture sizes (MB) to predict the future decoding times. In one embodiment, the value of the scale factor a is selected to optimize performance over all media content types (e.g. movies, sporting events and the like). In another embodiment, the scale factor can be selected based upon apriori information regarding the media type. For example, sporting events are known to have complex spatial and temporal compression, and therefore, the processing load to decode such media programs may be more accurately determined if the scale factor a is selected closer to zero, so that the influence of the number of macroblocks is more heavily weighted. Further, in another embodiment, the value of scale factor a may be adaptively chosen. In this embodiment, a scale factor is selected, and the a time duration required to decode a picture of a media program variant segment of another media program variant is estimated as shown in block 412. The accuracy of that estimate can be determined when the time duration required to decode the picture of a media program variant segment of another media program variant is actually computed. In this case, the difference between or ratio of the estimated time duration required to decode a picture of the subsequent media program segment and the actual time duration required to decode a picture of that subsequent media program segment can be used to select a new value for the scale factor. This permits the value of the scale factor a to be adaptively selected in real time or near real time. In still another embodiment, the weighting coefficient α may be adapted based on relationships between the bitrates and resolutions in the HLS bouquet (e.g. those bitrate and resolutions described in the master playlist).

Returning to FIG. 4A, block 414 compares the estimated time duration required to decode the picture of the media program variant segment of the another media program variant with a duration of the picture of the media program variant segment of the another media program variant. In block 416 illustrated in FIG. 4B, one of (1) another media program segment of the first variant (e.g. the temporally immediately subsequent media program segment of the same variant) and (2) another media program segment of another media program variant (e.g. the temporally immediately subsequent media program segment of another media program variant) is selected according to the comparison performed in block 414.

For example, referring to FIG. 3, the media program player 108 may receive and decode the requested media program segment 206-1 having the first (and lowest) bit rate and resolution, and determine the time duration required to decode a picture of this requested media program segment 206-1 (for example, by determining the average time duration to decode a picture of the media program segment 206-1 over a plurality of pictures) as described in blocks 408-412.

Using the average time duration to decode a picture of the media program segment 206-1 and (1) the bit rate of the media program segment S1VM 206-1 (typically, but not necessarily constant across that media program variant 206), (2) the resolution of the media program segment 206-1, (3) the bit rate associated with the temporally next segment of another media program variant (for example 206-2, 204-2 or 202-2, also typically, but not necessarily constant across that media program variants 206, 204, and 202), the (3) the resolution associated with the temporally next segment of the another media program variant for example 206-2, 204-2 or 202-2, also typically, but not necessarily constant across that media program variants 206, 204, and 202), the media player 108 estimates the time duration required to decode a picture of a media program variant segment (e.g. S2V1 202-2 or S2V2 204-2) of another media program variant (e.g. media program variants V1 202 or v2 204). The estimated time duration required to decode the picture of the media program variant segment of the another media program variant 202-2 S2V1 is compared with a duration of the picture of the media program variant segment of the another media program variant, and if this comparison indicates that the estimated time duration required to decode the picture of the temporally next media program variant segment 202-2 of the another media program variant is sufficiently less than the duration of the picture of that segment 202-2, the media player 108 will select that segment 202-2 for its next segment request.

In one embodiment, the media player performs the operations of blocks 412 and 414 to estimate the time duration required to decode pictures of every variant of the temporally next segment and compare the estimated decoding time with the picture duration of every variant of the temporally next segment before deciding which of variant of the temporally next segment to select. For example, referring to FIG. 2, the media player 108, after receiving the first media program segment of the lowest bit rate S1VM 206-1, decodes one or more of the pictures of that media program segment 206-1, and determines the (e.g. average) time required to decode each picture, $T_{dec}(V_1)$ of that first segment 202-1 S1V1. Using this value, Equation 1 can be used to estimate the (e.g. average) time duration required to decode a picture of the next segment (S2) of each media program variant (e.g. $T_{dec}(V_2)$, $T_{dec}(V_3)$, . . . , $T_{dec}(V_M)$), and select the next segment (S2) of the media program from the media program variant for which the estimated time duration required to decode the picture of the media program is closest to but less than the duration of the picture of the media program variant segment of the another media program variant.

Specifically, consider that measurements of the lowest quality variant picture decoding time ($T_{dec}(V_1)$) has been determined, and that estimates for the decoding time for the temporally next segment of each variant ($T_{dec}(V_2)$, $T_{dec}(V_3)$, . . . , $T_{dec}(V_M)$), has been determined. A threshold maximum bitrate value (maxBR) of the next segment of the media program can be set such that a CPU processing is adequate to decode the picture in the allotted time. Further, a margin (represented by β) may be included in this calculation, as shown in Equation 3 below:

$$\text{max}BR = \max_{i=1,\ldots,n} \{BR(V_i) \ni T_{dec}(V_i) < \beta T_{frame}\} \qquad \text{Equation (3)}$$

where $T_{frame}$ is the frame duration (which may be assumed for now to be constant across variants). For example, Table I shows calculations for a hypothetical variant bouquet for β=0.5, $T_{frame}$=1/30 fps=33.3 msecs, and lowest variant frame decode time $T_{dec}(V_1)$=3 msecs. Using the above equations, it is predicted that a 2 Mbps variant (i=5) could be supported by the CPU while the 3 Mbps 720p30 variant would not meet the β=0.5 margin criterion.

TABLE I

| i | Bitrate (bps) | $H_{res}$ | $V_{res}$ | Aspect Ratio | Total MBs | $T_{dec}(V_i)$ (secs) | $0.5T_{frame}$ (secs) |
|---|---|---|---|---|---|---|---|
| 1 | 440000 | 360 | 240 | 1.50 | 337.50 | 0.00300 | 0.0167 |
| 2 | 600000 | 512 | 288 | 1.78 | 576.00 | 0.00482 | 0.0167 |
| 3 | 800000 | 720 | 404 | 1.78 | 1136.25 | 0.00833 | 0.0167 |
| 4 | 1200000 | 720 | 404 | 1.78 | 1136.25 | 0.00954 | 0.0167 |
| 5 | 2000000 | 720 | 404 | 1.78 | 1136.25 | 0.01080 | 0.0167 |
| 6 | 3000000 | 1280 | 720 | 1.78 | 3600.00 | 0.02804 | 0.0167 |

Finally, returning to FIG. 4B, block 418 transmitting a request for the selected one of the another media program segment of the first variant and the another media program segment of the another media program variant according to the comparison. For example, in the above-discussed example, media program version 5 is selected and a request for the temporally next segment of this media program variant (S2V5) would be requested.

HTTP Streaming Standards Signaling for Bitrate and Resolution

In one embodiment, the foregoing method makes use of information about an Adaptive Bitrate (ABR) media program asset's available bitrates and video resolutions. This information is commonly provided in Apple HTTP Live Streaming (HLS) manifests (as described in R. Pantos and W. May, "HTTP Live Streaming", IETF RFC-8216, August 2017, which is hereby incorporated by reference) or MPEG Dynamic Adaptive Streaming over HTTP (DASH) Media Presentation Description (MPD) documents such as ISO/IEC 23009-1:2014(E), "Information Technology-Dynamic adaptive streaming over HTTP (DASH)—Part 1: Media presentation description and segment formats", May 15, 2014, also incorporated by reference herein.

In HLS, the master playlist describes the renditions and adaptive bit rate variants available for a given media asset. The tag:
EXT-X-STREAM-INF: <attribute-list>
contains a BANDWIDTH attribute that describes the segment bitrate and can also contain a RESOLUTION attribute (signaled in the EXT-X-MEDIA-SEQUENCE tag in the master playlist) that describes the pixel resolution for the video variant, e.g., 1280×720 or 1920×1080.

In MPEG DASH, media representation elements in the MPD XML document can carry the desired information, e.g.:
    <Representation id="6" bandwidth="256000" width="320" height="240">
    <BaseURL>8563456473.mp4</BaseURL>
    </Representation>

The ATPlayer front-end HLS or DASH parsing methods can extract these bandwidth and resolution attributes for use as parameters ($BR(V_1)$, $BR(V_i)$, $MB(V_1)$, and $MB(V_i)$ in estimating the time duration required to decode a picture of a media program variant segment of another media program variant.

In embodiments with variants that do not include the resolution attribute or signaling thereof, a short byte range can be acquired from the first segment in each variant and inspect the AVC sequence parameter set (SPS) to determine video resolution.

Performance

FIGS. 5-8 are diagrams illustrating exemplary performance of the foregoing technique of receiving and decoding media programs. The illustrated performance was obtained for an exemplary processor which was a 2012 vintage APPLE MAC MINI with a 2.3 GHz i7 processor and 8 GB of 1600 MHz DDR3. The performance was determined for different media programs, namely the movie "TEARS OF STEEL," "UPLYNK ABC," the movie "AIRPLANE," and an animation "BIG BUCK BUNNY," which is depicted in FIGS. 5-8, respectively.

Each figure of FIGS. 5-8 includes 8 curves:
"90 frame sliding decode time" is a 90-frame sliding window average of the frame decode time reported by VideoDecoder.cpp;

(2) "Decode time" is the 90 frame boxcar average as currently calculated by VideoDecoder::AverageDecodeRate (in the curves these results are scaled to μsecs to fit on the same y-axis as the scaled bitrates reported in kbps);

(3) "Current bitrate" and "Optimal bitrate" are the values reported by VariantManifest.cpp;

(4) "Variant bitrate" is the value associated with each frame decode time calculated in VideoDecoder.cpp and lags the optimal and current bitrate values due to the large H264 frame buffer (~60 secs) in front of the decoder;

(5) "scaled sliding decode time" curves are computed by inverting Equation (1) to yield $$T'_{dec}(V_1) = T_{dec}(V_i)\left[\alpha\frac{BR(V_1)}{BR(V_i)} + (1-\alpha)\frac{MB(V_1)}{MB(V_i)}\right] \quad \text{Equation (4)}$$

for $i = 1, \ldots, n$ where $T_{dec}'(V_1)$ is now an estimate of the frame decoding time for the first variant based on the 90-sec sliding window average frame decoding times for the other variants $V_i$. If there exists a linear relationship between the effect of bit rate and resolution on the decoding time, $T'_{dec}(V_1)$, as expressed in Equation (4) should be linear, with a slope of zero.

(6) The "BR scaled sliding decode time" curve corresponds to only using the variant bitrate for calculating decoding times, i.e., α=1.

(7) The "MB scaled sliding decode time" curve corresponds to weighting based only on the variant resolution (macroblock) ratios, i.e., α=0.

(8) The "0.75 MB+0.25BR scaled sliding window time" curve corresponds to a weighting of α=0.25.

From the results, it is noted that while the decoder 126 is operating on a given variant bitrate the software video decoder 126 (VideoDecoder.cpp) returns frame decode times that cause the VariantManifest.cpp Optimal bitrate and Current bitrate values to rapidly increment to the next variant bitrate. The player 108 frontend will begin to download the next segment of that new media program variant and fill the coded picture buffer (~60 sec h264 frame buffer) while the decoder 126 continues decoding the older (lower) bitrate. This results in long delays for moving to the next variant. If the next variant cannot be decoded in real-time, the decoder and player will stall video rendering until a new lower rate variant is chosen and 60 secs of buffer (with the variant of too high of a bit rate) has been cleared. In this new algorithm, it is desired to jump to the next or higher variants than the next highest, but only if it is known the processor can support it.

Figure 5:
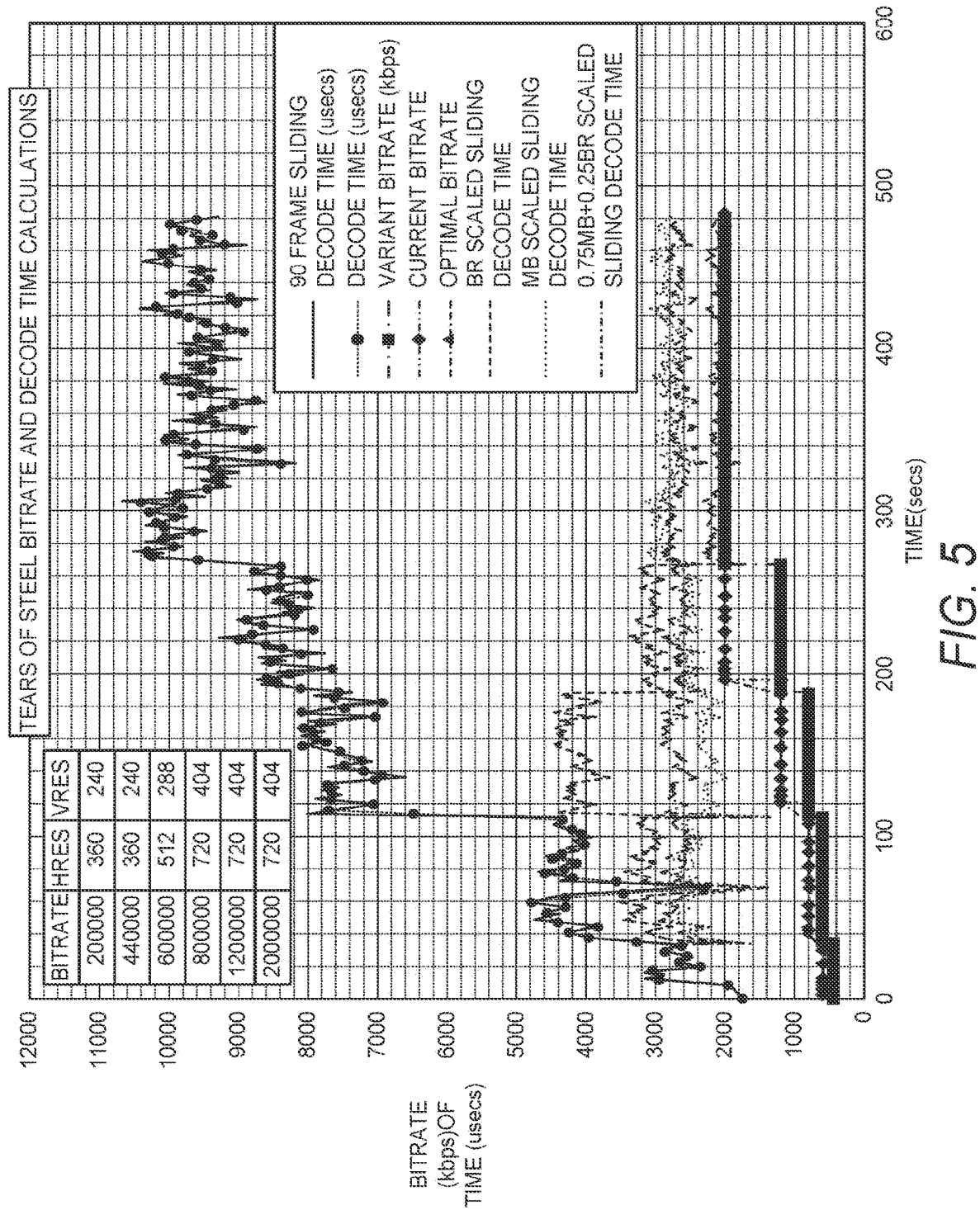
FIGS. 5-8 are diagrams depicting exemplary performance of the foregoing technique of receiving and decoding media programs for media programs of differing characteristics.
Figure 6:
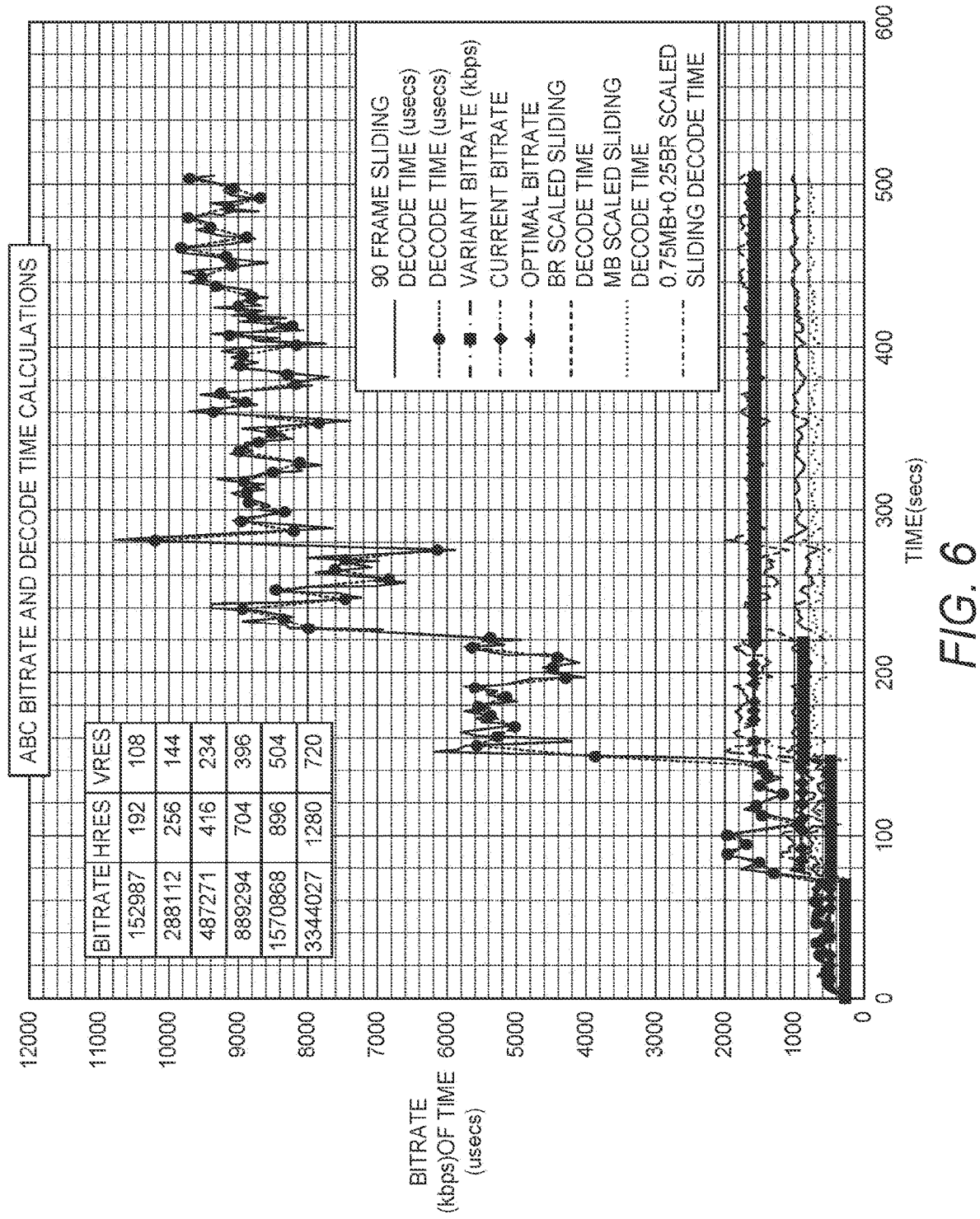
Figure 7:
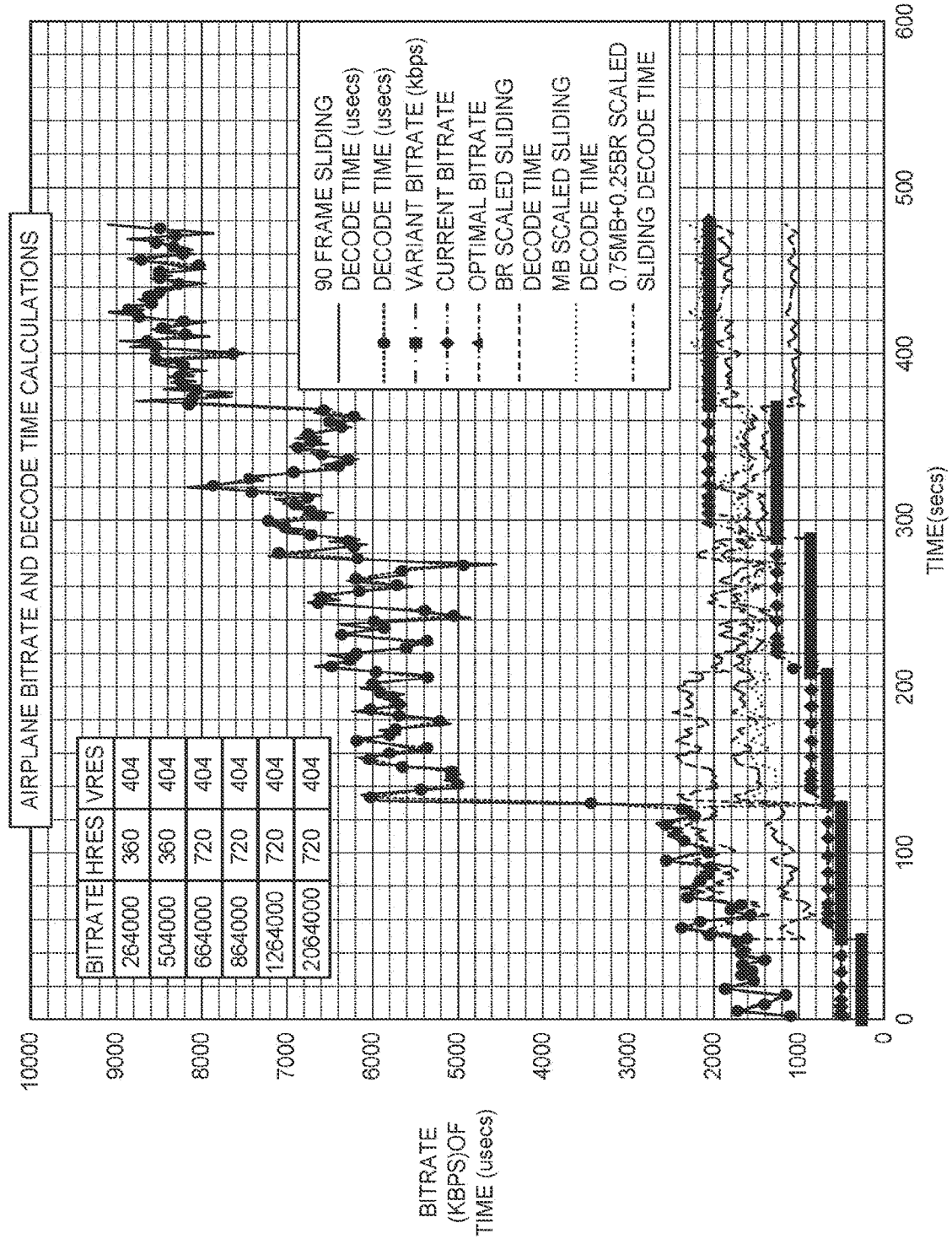
Figure 8:
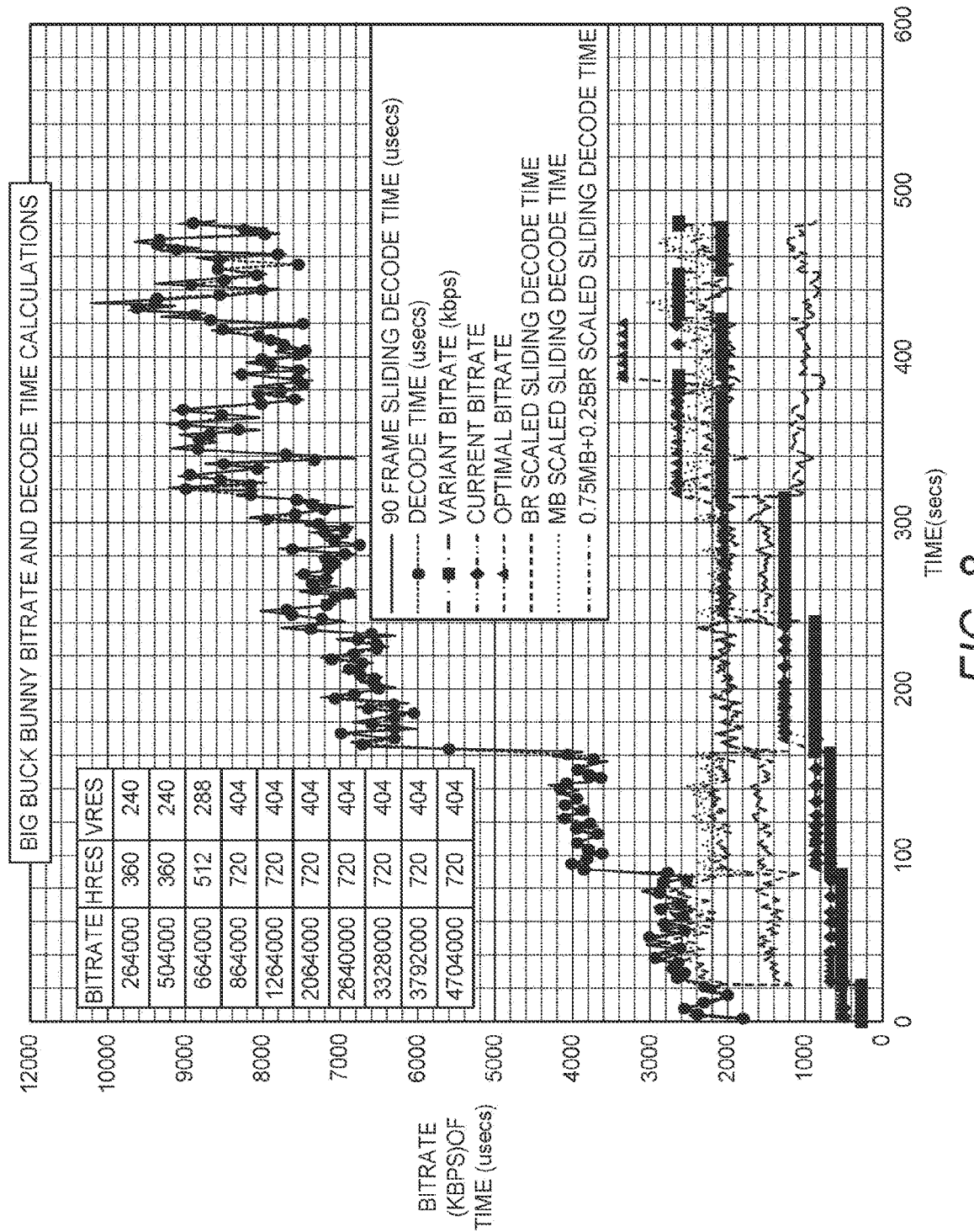

It is also noted that the choice of α=0.25 weighting factor does not produce the desired result for all content. For the TEARS OF STEEL clip, FIG. 5 shows that the weighting looks fairly accurate (since the 0.75 MB+0.25 BR scaled sliding decode time is fairly linear) while for the ABC clip (which has many different variant resolutions, a better choice is full MB scaling (α=0), as that would the MB scaled sliding decode time is more linear than the 0.75 MB+0.25 BR scaled sliding decode time. Also note that for AIRPLANE and BIGBUCKBUNNY clips which have a limited set of resolutions (repeated 720×404 at higher bitrates), FIGS. 7 and 8 show that using α=0.25 with initial variant decoding times could result in a conservative maxBR setting, and that BR scaled decoding time curves (α=1) show the most variation and demonstrate that scaling solely based on BR could result in conservative estimate of maxBR.

Hardware Environment

Figure 9:
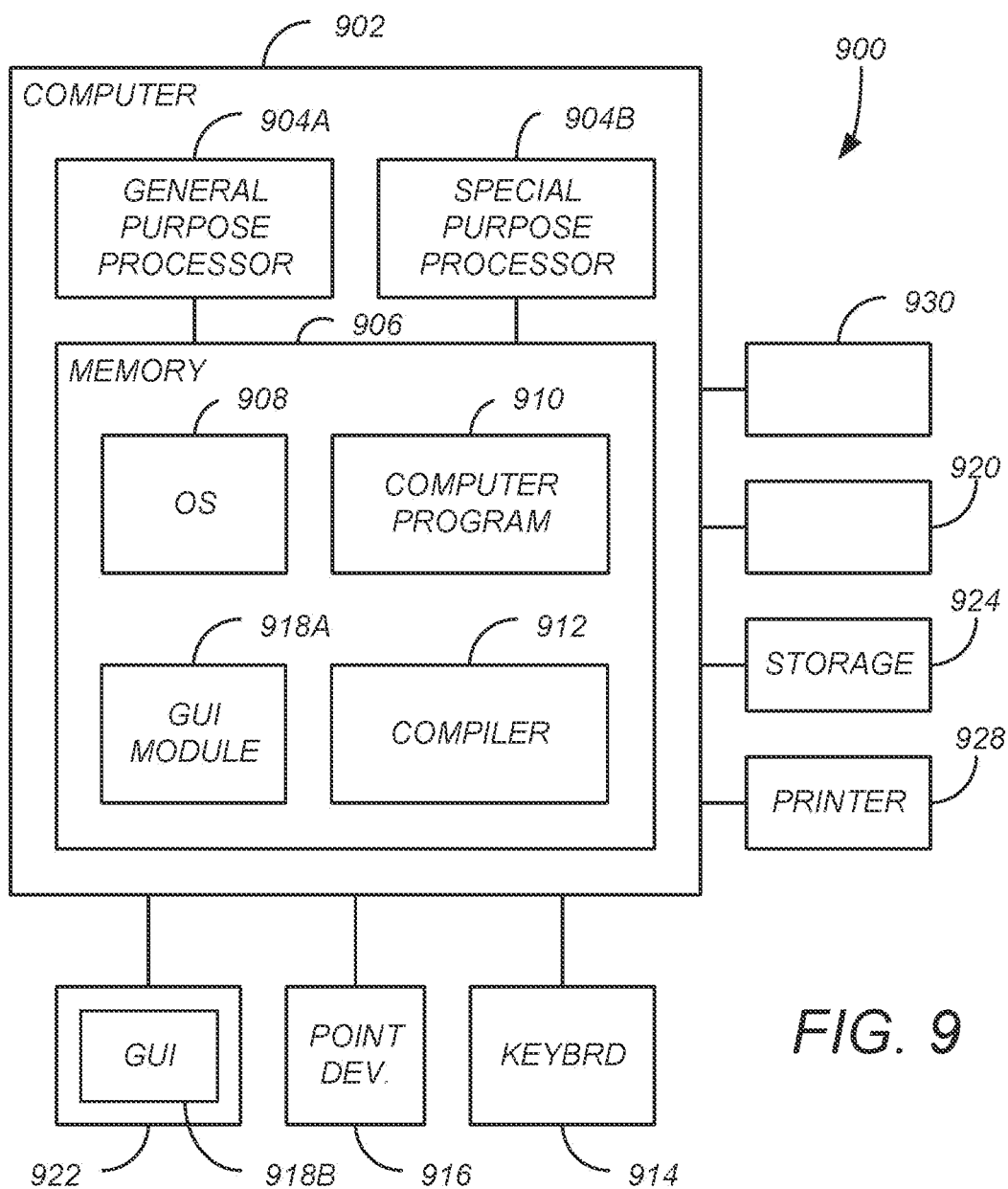
FIG. 9 is a diagram illustrating an exemplary system that could be used to implement processing elements of the content distribution system.

FIG. 9 illustrates an exemplary computer system 900 that could be used to implement processing elements of the above disclosure, including the receiver 102, media program player 108, interface module 106, media program provider 104, and media server 110. The computer 902 comprises a processor 904 (e.g. general purpose processor 904A and/or special purpose processor 904B) and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, a printer 928, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

The foregoing discloses an apparatus, method and system for receiving and decoding a media program. The media program is selected from a plurality of media program variants, each of the plurality of media program variants of an associated resolution and generated for transmission at an associated bit rate different than a bit rate associated with the other media program variants, each of the plurality of media program variants including an associated plurality of media program version segments. In one embodiment, the method includes (a) transmitting a request for the media program; (b) receiving a master playlist for the requested media program. The master playlist including the bit rate and a resolution associated with each media program variant and an index to plurality of media playlists, each media playlist having an address to each of a plurality of media program segments of an associated variant of the media program. The method also includes (c) transmitting a request for a media program segment of a first variant of the media program, wherein the first variant of the media program generated for transmission at a first bit rate and having a first resolution and (d) receiving the requested media program segment. The method also includes (e) determining a time duration required to decode a picture of the received media program segment and (f) estimating a time duration required to decode a picture of a media program variant segment of another media program variant. This is determined at least in part from: the determined time duration required to decode the picture of the received media program segment, the first bit rate, the first resolution, a bit rate associated with the another media program variant, and a resolution associated with the another media program variant. The method also includes (g) comparing the estimated time duration required to decode the picture of the media program variant segment of the another media program variant with a duration of the picture of the media program variant segment of the another media program variant, (h) selecting one of another media program segment of the first variant and another media program segment of the another media program variant according to the comparison, and (i) transmitting a request for the selected one of the another media program segment of the first variant and the another media program segment of the another media program variant according to the comparison.

Implementations may include one or more of the following features:

Any of the methods described above, wherein the time duration required to decode a picture of a media program variant segment of another media program variant is estimated at least in part from: the determined time duration required to decode the picture of the received media program segment; a ratio of the first bit rate and the bit rate associated with the another media program variant; and a ratio of the first resolution and the resolution associated with the another media program variant.

Any of the methods described above, wherein: the ratio of the first bit rate and the bit rate associated with the another media program variant and the ratio of the first resolution and the resolution associated with the another media program variant are weighted.

Any of the methods described above, wherein: the estimated time duration required to decode a picture of a media program variant segment of another media program variant is determined from a linear combination of the weighted ratio of the first bit rate and the bit rate associated with the another media program variant and ratio of the first resolution and the resolution associated with the another media program variant.

Any of the methods described above, wherein the estimated time duration required to decode a picture of a media program variant segment of another media program variant is estimated at least in part from:

$$T_{dec}(V_i) = T_{dec}(V_1) \left[ \alpha \frac{BR(V_1)}{BR(V_i)} + (1-\alpha) \frac{MB(V_1)}{MB(V_i)} \right]^{-1}$$

for $i = 1, \ldots, M$;

wherein: $T_{dec}(V_i)$ is the estimated time duration required to decode a picture of a media program variant segment of another media program variant; $T_{dec}(V_1)$ is the determined time duration require to decode the picture of the received media program segment; $BR(V_1)$ is the first bit rate; $BR(V_i)$ is the bit rate associated with the another media program variant; $MB(V_1)$ is the first resolution; $MB(V_i)$ is the resolution associated with the another media program variant; $\alpha$ is a weighting factor determining the weighted ratio; and M is a number of media program variants.

Any of the methods described above, method wherein the weighting factor is determined according to a media program type. The method wherein the weighting factor is adjusted in real time based upon a comparison between the estimated time duration required to decode a picture of a media program variant segment of another media program and a measured time duration required to decode a picture of a media program variant segment of another media program.

Another embodiment is evidenced by a an apparatus of receiving and decoding a media program, comprising a processor and communicatively coupled memory storing processor instructions including the processor instructions described above, in each combination of embodiments.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of receiving and decoding a media program, the media program selected from a plurality of media program variants, each of the plurality of media program variants of an associated resolution and generated for transmission at an associated hit rate different than a bit rate associated with the other media program variants, each of the plurality of media program variants comprising an associated plurality of media program version segments, the method comprising:
  (a) transmitting a request for the media program;
  (b) receiving a master playlist for the requested media program, the master playlist comprising: the bit rate and a resolution associated with each media program variant; an index to plurality of media playlists, each media playlist having an address to each of a plurality of media program segments of an associated variant of the media program;
  (c) transmitting a request for a media program segment of a first variant of the media program, the first variant of the media program generated for transmission at a first bit rate and having a first resolution;
  (d) receiving the requested media program segment;
  (e) determining a time duration required to decode a picture of the received media program segment;
  (f) estimating a time duration required to decode a picture of a media program variant segment of another media program variant at least in part from: the determined time duration required to decode the picture of the received media program segment; the first bit rate: the first resolution; a bit rate associated with the another media program variant; and a resolution associated with the another media program variant;
  (g) comparing the estimated time duration required to decode the picture of the media program variant segment of the another media program variant with a duration of the picture of the media program variant segment of the another media program variant;
  (h) selecting one of another media program segment of the first variant or another media program segment of the another media program variant according to the comparison; and
  (i) transmitting a request for the selected one of the another media program segment of the first variant or the another media program segment of the another media program variant according to the comparison.

2. The method of claim 1, wherein the time duration required to decode a picture of a media program variant segment of another media program variant is estimated at least in part from:
  the determined time duration required to decode the picture of the received media program segment;
  a ratio of the first bit rate and the bit rate associated with the another media program variant; and
  a ratio of the first resolution and the resolution associated with the another media program variant.

3. The method of claim 2, wherein:
  the ratio of the first bit rate and the bit rate associated with the another media program variant and the ratio of the first resolution and the resolution associated with the another media program variant are weighted.

4. The method of claim 3, wherein:
  the estimated time duration required to decode a picture of a media program variant segment of another media program variant is determined from a linear combination of the weighted ratio of the first bit rate and the bit rate associated with the another media program variant and ratio of the first resolution and the resolution associated with the another media program variant.

5. The method of claim 4, wherein the estimated time duration required to decode a picture of a media program variant segment of another media program variant is estimated at least in part from:

$$T_{dec}(V_i) = T_{dec}(V_1)\left[\alpha\frac{BR(V_1)}{BR(V_i)} + (1-\alpha)\frac{MB(V_1)}{MB(V_i)}\right]^{-1}$$

for $i = 1, \ldots, M$;

wherein:

$T_{dec}(V_i)$ is the estimated time duration required to decode a picture of a media program variant segment of another media program variant;

$T_{dec}(V_1)$ is the determined time duration require to decode the picture of the received media program segment;

$BR(V_1)$ is the first bit rate;

$BR(V_i)$ is the bit rate associated with the another media program variant;

$MB(V_1)$ is the first resolution;

$MB(V_i)$ is the resolution associated with the another media program variant;

α is a weighting factor determining the weighted ratio; and

M is a number of media program variants.

6. The method of claim 5, wherein the weighting factor is determined according to a media program type.

7. The method of claim 5, wherein the weighting factor is adjusted in real time based upon a comparison between the estimated time duration required to decode a picture of a media program variant segment of another media program and a measured time duration required to decode a picture of a media program variant segment of another media program.

8. The method of claim 1, wherein:

the determined time duration required to decode the picture of the received media program segment is determined as an average time duration required to decode each picture of a plurality of pictures of the media program segment.

9. The method of claim 1, wherein:

(f) and (g) are repeated for each of the plurality of media program variants in the master playlist; and (h) selecting one of another media program segment of the first variant or another media program segment of the another media program variant according to the comparison comprises:

selecting the another media program variant as the media program variant for which the estimated time duration required to decode the picture of the media program is closest to but less than the duration of the picture of the media program variant segment of the another media program variant.

10. The method of claim 1, wherein:

(f) and (g) are repeated for each of the plurality of media program variants in the master playlist; and (h) selecting one of another media program segment of the first variant or another media program segment of the another media program variant according to the comparison comprises:

selecting the another media program variant as the media program variant for which the estimated time duration required to decode the picture of the media program is closest to but less than a scaled duration of the picture of the media program variant segment of the another media program variant.

11. An apparatus of receiving and decoding a media program, the media program selected from a plurality of media program variants, each of the plurality of media program variants of an associated resolution and generated for transmission at an associated bit rate different than a bit rate associated with the other media program variants, each of the plurality of media program variants comprising an associated plurality of media program version segments, the apparatus comprising: a processor; a memory, the memory storing processor instructions comprising instructions for:

(a) transmitting a request for the media program;

(b) receiving a master playlist for the requested media program, the master playlist comprising: the bit rate and a resolution associated with each media program variant; an index to plurality of media playlists, each media playlist having an address to each of a plurality of media program segments of an associated variant of the media program;

(c) transmitting a request for a media program segment of a first variant of the media program, the first variant of the media program generated for transmission at a first bit rate and having a first resolution;

(d) receiving the requested media program segment;

(e) determining a time duration required to decode a picture of the received media program segment;

(f) estimating a time duration required to decode a picture of a media program variant segment of another media program variant at least in part from: the determined time duration required to decode the picture of the received media program segment; the first bit rate; the first resolution; a bit rate associated with the another media program variant; and a resolution associated with the another media program variant;

(g) comparing the estimated time duration required to decode the picture of the media program variant segment of the another media program variant with a duration of the picture of the media program variant segment of the another media program variant;

(h) selecting one of another media program segment of the first variant or another media program segment of the another media program variant according to the comparison; and (i) transmitting a request for the selected one of the another media program segment of the first variant or the another media program segment of the another media program variant according to the comparison.

12. The apparatus of claim 11, wherein the time duration required to decode a picture of a media program variant segment of another media program variant is estimated at least in part from:

the determined time duration required to decode the picture of the received media program segment;

a ratio of the first bit rate and the bit rate associated with the another media program variant; and a ratio of the first resolution and the resolution associated with the another media program variant.

13. The apparatus of claim 12, wherein:

the ratio of the first bit rate and the bit rate associated with the another media program variant and the ratio of the first resolution and the resolution associated with the another media program variant are weighted.

14. The apparatus of claim 13, wherein:

the estimated time duration required to decode a picture of a media program variant segment of another media program variant are determined from a linear combination of the weighted ratio of the first bit rate and the bit rate associated with the another media program variant and ratio of the first resolution and the resolution associated with the another media program variant.

15. The apparatus of claim 14, wherein the estimated time duration required to decode a picture of a media program variant segment of another media program variant is estimated at least in part from:

$$T_{dec}(V_i) = T_{dec}(V_1)\left[\alpha\frac{BR(V_1)}{BR(V_i)} + (1-\alpha)\frac{MB(V_1)}{MB(V_i)}\right]^{-1}$$

for $i = 1, \ldots, M$;

wherein:
- $T_{dec}(V_i)$ is the estimated time duration required to decode a picture of a media program variant segment of another media program variant;
- $T_{dec}(V_1)$ is the determined time duration required to decode the picture of the received media program segment;
- $BR(V_1)$ is the first bit rate;
- $BR(V_i)$ is the bit rate associated with the another media program variant;
- $MB(V_1)$ is the first resolution;
- $MB(V_i)$ is the resolution associated with the another media program variant; and
- M is a number of media program variants.

16. The apparatus of claim 15, wherein the weighting factor is determined according to a media program type.

17. The apparatus of claim 15, wherein the weighting factor is adjusted in real time based upon a comparison between the estimated time duration required to decode a picture of a media program variant segment of another media program and a measured time taken to decode a picture of a media program variant segment of another media program.

18. The apparatus of claim 11, wherein:
the determined time duration required to decode the picture of the received media program segment is determined as an average time taken to decode each picture of a plurality of pictures of the media program segment.

19. The apparatus of claim 11, wherein:
the instructions further comprise instructions for repeating (f) and (g) for each of the plurality of media program variants in the master playlist; and
the instructions for selecting one of another media program segment of the first variant or another media program segment of the another media program variant according to the comparison comprise instructions for:
selecting the another media program variant as the media program variant for which the estimated time duration required to decode the picture of the media program is closest to but less than the duration of the picture of the media program variant segment of the another media program variant.

20. The apparatus of claim 11, wherein:
the instructions further comprise instructions for repeating (f) and (g) for each of the plurality of media program variants in the master playlist; and
the instructions for selecting one of another media program segment of the first variant or another media program segment of the another media program variant according to the comparison comprise instructions for:
selecting the another media program variant as the media program variant for which the estimated time duration required to decode the picture of the media program is closest to but less than a scaled duration of the picture of the media program variant segment of the another media program variant.

* * * * *